United States Patent [19]
Kafka et al.

[11] Patent Number: 4,685,107
[45] Date of Patent: Aug. 4, 1987

[54] DISPERSION COMPENSATED FIBER RAMAN OSCILLATOR

[75] Inventors: James D. Kafka; Thomas M. Baer; David F. Head, all of Mountain View, Calif.

[73] Assignee: Spectra-Physics, Inc., San Jose, Calif.

[21] Appl. No.: 872,295

[22] Filed: Jun. 9, 1986

[51] Int. Cl.⁴ .............................................. H01S 3/30
[52] U.S. Cl. ......................................... 372/6; 372/94; 372/27; 372/25; 372/20; 372/5; 372/3
[58] Field of Search ..................... 372/6, 3, 25, 97, 20, 372/93, 92, 69, 70, 18, 27, 102, 94, 9, 5; 350/356

[56] References Cited
PUBLICATIONS

Stolen et al; "A Time-Dispersion-Tuned Fiber Raman Oscillator"; Appl. Phys Lett. vol. 30, No. 7, Apr. 1, 1977.

Lin et al; "A Near-Infrared Fiber Raman Oscillator Tuned from 1.07 to 1.32 μm"; Appl. Phys Lett. 34(10), May 15, 1979.

Primary Examiner—Leon Scott, Jr.
Attorney, Agent, or Firm—Paul Davis

[57] ABSTRACT

A dispersion compensation delay line is added to a synchronously pumped fiber Raman ring oscillator to generate subpicosecond pulses. A pair of spaced gratings form the delay line. An interference filter is used as a bandwidth limiting tuning element to provide a good quality short pulse. An integrated design eliminates the discrete optical elements by using only an optical fiber and an optical fiber coupler.

19 Claims, 3 Drawing Figures

FIG. 1
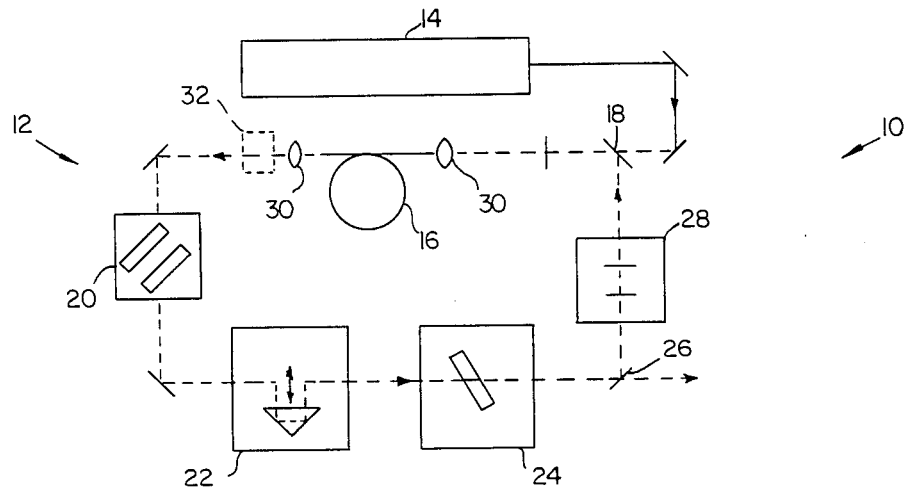
FIG. 2
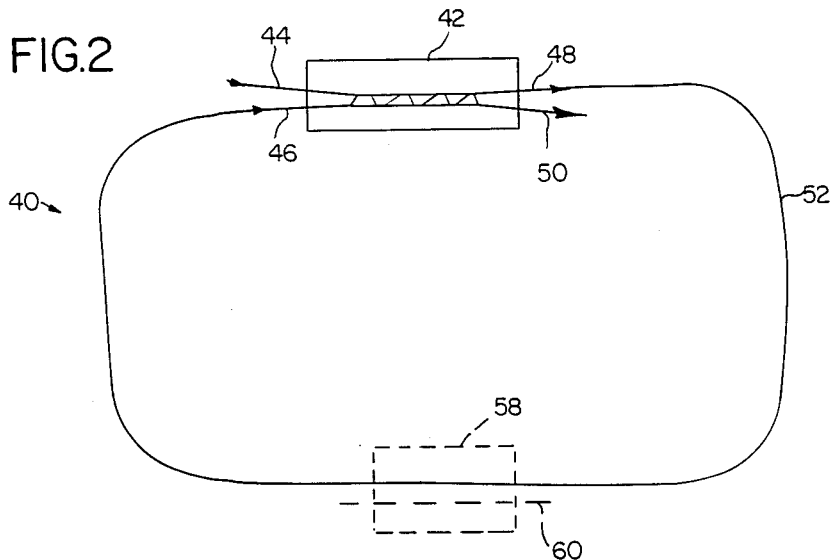
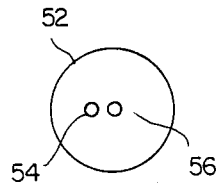
FIG. 3

DISPERSION COMPENSATED FIBER RAMAN OSCILLATOR

BACKGROUND OF THE INVENTION

The invention relates to fiber Raman lasers, and more particularly to the production of short pulses in fiber Raman laser oscillators.

Fiber Raman lasers are described in the *Handbook of Laser Science and Technology*, Section 2: "Solid State Lasers", Subsection 2.4 "Fiber Raman Lasers", by R. H. Stolen and C. Lin, pages 265–273. A mode-locked YAG or Argon laser is used to synchronously pump a fiber, and the Raman effect in the fiber provides gain, in a fiber Raman oscillator. The output is shifted to the red; the pulse width is typically about the same as the pump pulse length for longer pump pulses while pulse broadening dominates for short pump pulses. By comparison, synchronously pumped dye lasers absorb light at one wavelength and emit light at another wavelength. When the dye absorbs a pump pulse, it emits a much shorter pulse. Thus with a 100 ps pump pulse it is possible to obtain 1 ps output pulses from a dye laser but it is not generally possible to obtain a shorter pulse from a fiber Raman oscillator. Shortening the pump pulse length to 1 ps will not produce subpicosecond pulse outputs in a fiber Raman oscillator since the fiber is dispersive and broadens the pulse; a typical 100 m fiber produces many picoseconds of spreading or pulse broadening for a 1 ps pump pulse.

In order to prevent pulse spreading in a fiber Raman oscillator it is possible to operate near a single zero dispersion wavelength (about 1.57 microns) as demonstrated by M. N. Islam and L. F. Mollenauer at Bell Laboratories, *IQEC 1986 Advance Program*, page 45 and *Lasers and Applications*, May 1986, pages 66–67. However, this method imposes severe constraints of operating at a particular wavelength for which pump sources are not readily available and producing an output which may not match the desired application.

Another method of producing short pulses utilizes the pulse compression techniques of U.S. patent application Ser. No. 729,376 filed May 1, 1985. However, this method requires long fiber lengths and high pump power. Furthermore the output pulse characteristics are highly dependent on pump source intensity and pulse width.

SUMMARY OF THE INVENTION

Accordingly it is an object of the invention to produce short pulses at any color in a fiber Raman oscillator.

It is also an object to produce subpicosecond pulses at any color in a fiber Raman oscillator.

It is another object to produce output pulses which are shorter than pump pulses in a fiber Raman oscillator similar to that obtained from a synchronously pumped dye laser.

It is a further object to integrate as many components as possible into a simple oscillator design.

The invention is method and apparatus for generating subpicosecond pulses from a synchronously pumped fiber Raman oscillator by adding a dispersion compensating delay line. In a preferred embodiment, the oscillator is a ring oscillator which includes a 100 m optical fiber and the dispersive delay line is a grating pair. A tuning element, e.g., an interference filter, is also added to the oscillator to limit the oscillating bandwidth and thereby enhance short pulse generation. with a pumping source of CW mode-locked Nd:YAG laser emitting 80 ps pulses at 1064 nm fiber Raman oscillator pulses at 100 nm as short as 0.8 ps are obtained.

The fiber Raman laser is an ideal gain medium for a synchronously pumped source because of its high gain which allows the insertion of intercavity elements, including the dispersion compensating delay line and tuning element in accordance with the invention, and its gain bandwidth which is sufficient to support subpicosecond pulses. Group velocity dispersion (GVD) is a potential limit to the pulse width when short pulse propagates through the fiber. The invention uses the dispersive delay line to compensate for the GVD of the fiber, by adjusting the spacing between the grating pair to produce a GVD of the same magnitude but opposite sign to the GVD of the fiber. Thus in one complete round trip in the ring oscillator, the dispersion of the grating pair compensates for the dispersion of the fiber and pulse broadening does not occur. The addition of the dispersive delay line allows the fiber Raman oscillator to support short pulses at any wavelength. Since the gain of the fiber is broadband the tuning element is included in the oscillator to restrict the bandwidth to a range necessary for the short pulse widths. For synchronous pumping by the pump source the length of the fiber ring oscillator must be accurately controlled to match the round trip time of the oscillator to an integer multiple of the pump pulse separation, e.g., 40. A temporal delay element such as a translatable prism is included in the oscillator to adjust path lengths. Polarization reconstruction elements can be included in the oscillator to change polarization as required.

In an alternate embodiment, a dispersion compensated fiber Raman oscillator is constructed solely from optical fibers and optical fiber couplers. Compensating dispersion is provided by transfer between two fibers in a coupler or two cores in a two core fiber.

BRIEF DESCRIPTION OF THE DRAWINGS

FIG. 1 is a schematic view of a dispersion compensated fiber Raman ring oscillator.

FIG. 2 is a schematic view of an embodiment using only optical fibers and optical fiber couplers.

FIG. 3 is a cross-sectional view of a two core fiber used in the embodiment of FIG. 2.

DETAILED DESCRIPTION OF THE PREFERRED EMBODIMENTS

In one preferred embodiment, shown in FIG. 1, a dispersion compensated fiber Raman oscillator 10 is made up of a ring oscillator 12 synchronously pumped by a pumping source 14. The ring oscillator 12 includes an optical fiber 16. A dichroic beamsplitter 18 forms a part of ring oscillator 12 and allows pulses from pumping source 14 to be input into the ring into the optical fiber 16. The output from the optical fiber 16 passes through a dispersive delay line (compensating dispersion means) 20, a temporal delay means 22, and a tuning element 24. The pulses in the ring oscillator 12 are then incident on mirror 26 which forms the output coupler (e.g., 20% reflecting, 80% transmitting at 1100 nm) for the ring oscillator. The portion of the pulses reflected by mirror 26 passes through polarization reconstruction means 28 to reset the polarization of the pulses as desired and is then incident on beamsplitter 18 which directs the pulses back into fiber 16. The elements are thus arranged in a ring configuration, with additional mirrors or other recirculation means where necessary, so that pulses make continuous passes around the ring. However, the principle of the invention can be applied to any fiber Raman oscillator configuration.

The pumping source 14 in a preferred embodiment is a CW mode-locked Nd:YAG laser emitting 80 pulses at 1064 nm. Pumping source 14 synchronously pumps optical fiber 16, i.e., pulses from source 14 coincide with pulses passing around ring oscillator 12 on each round trip. Only a single pulse can be travelling around the ring or multiple pulses. An 8W Spectra-Physics Model 3000 CW Modelocked Nd:YAG laser operated at 80 MHz pulse rate is used, but the pulse rate can be varied typically from 1 MHz to 100 MHz depending on the fiber length and the number of pulses in the oscillator. Laser powers of 2-5 W can typically be used. Any mode locked source including mode locked Argon lasers, mode locked dye lasers, or synchronously pumped cavity dumped dye lasers. By eliminating losses in the oscillator, lower power lasers could also be used, e.g., 100 mW diode pumped YAG lasers. The pulses from source 14 are input into the ring oscillator through dichroic beamsplitter 18 which is highly transmissive at 1064 nm but highly reflective at 1100 nm. The source 14 may be directly aligned or additional mirrors may be used to direct the pulses into the ring.

The optical fiber 16 in a preferred embodiment is 100 m of single mode non-polarization preserving fiber. The fiber exhibits a high gain through the Raman effect for pulses travelling around the ring oscillator and pumped by synchronous pulses from pumping source 14. A pair of lenses 30, e.g., microscope objectives, are positioned at the ends of fiber 16 for focusing into the fiber and collimating. For the synchronous pumping condition to be satisfied, the roundtrip time around the oscillator must be matched. The roundtrip time is approximately matched by selecting the proper length of fiber (with more accurate adjustment performed by temporal delay means 22). In a preferred embodiment, with a pulse rate of 80 MHz, the pulses are spaced about 2.5 m in the fiber, so that 40 pulses are travelling around the 100 m fiber oscillator. In general a wide range of fiber lengths can be used; however, in combination with dispersive delay line 20 fibers 80-130 m are preferred and 90-110 m are more preferred at present.

The dispersive delay line 20 is the dispersion correcting means of the invention which allows short (sub-picosecond) pulses of any color to be obtained from the fiber Raman oscillator. In a preferred embodiment the dispersive delay line 20 is a pair of parallel gratings in which the spacing is changed to provide a group velocity dispersion which is of substantially the same magnitude (preferably slightly larger) but of the opposite sign of the group velocity dispersion of the fiber 16 so that in a roundtrip through the ring oscillator 12 the effects compensate or cancel out. A single pass grating pair, a double pass grating pair, or a prism pair can be used. An example of a preferred grating is a 1700 line gold coated holographic diffraction grating available from American Holographic, Acton, Mass. With this grating and a 100 m fiber, an 0.3 inch grating spacing is used. Dispersive interferometers or atomic vapors could also be used. In the two parallel gratings it is advantageous to pass through, step up slightly and pass back through since this doubles the temporal effects but cancels any spatial spreading of the beam. This double pass technique is similar to that described in U.S. patent application Ser. No. 729,376, filed May 1, 1985 which is herein incorporated by reference. As previously described, the fibers can be of various lengths; at the lower end the fiber cannot be too short for enough gain while at the longer end the fiber cannot be too long that compensation becomes impossible (which may occur because the effects are not completely linear). Longer fibers require longer grating spacings. In present embodiments, fiber lengths of 80-130 m and preferably 90-110 m can be compensated.

Temporal delay means 22 are used to satisfy the pumping synchronization condition. Although the fiber length can be roughly matched to the pumping frequency, matching to 100 microns is required. The temporal delay means 22 is a means to vary the path length in the oscillator without disturbing the beam. A preferred embodiment uses a movable prism mounted on a stepper motor so the path length can be changed while the beam orientation is unaffected.

Tuning element 24 is also an important element of the invention and is used to restrict the bandwidth to a desired range for high quality short pulses. Thus according to the invention, tuning element 24 is used as a bandwidth limiting tuning means. Because of the broadband gain of the fiber, the laser can oscillate over many wavelengths which produces noise and poor pulse quality. The turning element is not used exclusively in the conventional manner to obtain single wavelength, but for a range of wavelengths which provide good pulse quality and short pulse width. In order to obtain short pulse widths it is necessary that a range of wavelengths, and not just a single wavelength, be present. In a preferred embodiment, the tuning element 24 is a bandpass filter which is adjusted by tilting its angle. Tilting the bandpass filter changes the bandpass. A suitable bandpass filter is a 10 nm bandpass filter centered at 1125 nm available from Horiel Corporation, Stratford, Conn. Other tuning elements that can be used include birefringent filters, prisms, gratings, or etalons.

Polarization reconstruction means 28 are used to reset the polarization before the pulses go back into the loop. A pair of conventional waveplates, e.g., a quarter-wave and a half-wave plate or other combinations, can be used; the waveplates are rotated to produce the right polarization. Because of twists and bends in the fiber, the polarization of the pulse is changed. Additional polarization reconstruction means can be placed at other positions in the ring as desirable, e.g., polarization reconstruction means 32 before the dispersive delay line 20 to provide linear polarization for the gratings. Suitable waveplates are available from Virgo Optics, Port Richie, Fla.

An alternative integrated embodiment of the ring resonator of the invention which eliminates the individual discrete components is shown in FIG. 2. In the embodiment of FIG. 1 the losses are high, up to 99%, but the high gain of the fiber is sufficient. However, by decreasing the losses a lower power pumping source can be used, e.g., a 100 mW diode pumped YAG laser. The integrated dispersion compensated fiber Raman oscillator 40 utilizes a two port optical fiber coupler 42 which has two input ports 44, 46 and two output ports 48, 50. One output port 48 is connected to one input port 46 by optical fiber 52 to form a loop. The pumping pulses are input through port 44 and output is removed through port 50. The large losses at the dichroic mirror are thus eliminated. Coupler 42 has the property that light at one wavelength (the Raman oscillator frequency), i.e., 1100 nm, is strongly coupled so that after the pulses have made one pass around the loop they are coupled back to the start of the loop, i.e., pulses returning to port 46 are coupled to and output from port 48. A portion of the pulse is output at port 50. The pumping pulses, i.e., 1064 nm, make one pass around the loop and are not coupled so they pass through port 50 after the single pass. The temporal delay is provided by accurately determining the length of the fiber and also by adjusting the laser repetition rate to match the fiber length. The polarization is taken care of by using polarization preserving fibers. The delay line and tuning are provided by using two core fibers or by using a second coupler. In the case of the two core fiber, fiber 52 is made of cores 54 and 56 which are closely spaced, as shown in FIG. 3. One core 56 is lossy at certain wavelengths (which are coupled between the cores) and the laser is operated at wavelengths that do not bridge the gap between cores 54 and 56, i.e. the desired wavelength range. In the alternate embodiment a second coupler 58 is provided in the loop where the desired wavelengths do not couple across while the undesired wavelengths couple across and are eliminated. The coupler 42 and optional coupler 58 also have the proper dispersion effects to compensate for the dispersion effects in fiber 52, i.e. coupling at different wavelengths (red and blue) is different so that compensating delays for the fiber dispersion are produced.

Changes and modifications in the specifically described embodiments can be carried out without departing from the scope of the invention which is intended to be limited only by the scope of the appended claims.

We claim:

1. A dispersion compensated fiber Raman oscillator for producing short pulses at any wavelength, comprising:
    a synchronous pumping source;
    an optical fiber optically aligned with the pumping source;
    dispersion compensating delay means optically aligned with the fiber to allow short pulses of any wavelength to be received from the fiber;
    ring configuration means for recirculating and passing optical pulses back through the fiber;
    input coupling means; said synchronous pumping source being aligned with said input coupling means to input pumping pulses to the optical fiber;
    output coupling means;
    the optical fiber, dispersion compensating delay means, ring configuration means, input coupling means, and output coupling means being arranged in an oscillator configuration; said oscillator configuration further includes: a band width tuning means for tuning a range of wavelengths to provide good pulse quality and short pulse width, a temporal delay means for varying the path length in the oscillator configuration to thereby produce subpicosecond pulses.

2. The fiber Raman oscillator of claim 1 further comprising bandwidth limiting tuning means in the oscillator configuration.

3. The fiber Raman oscillator of claim 2 wherein the tuning means comprise a tiltable bandpass filter.

4. The fiber Raman oscillator of claim 1 further polarization reconstruction means in the oscillator configuration.

5. The fiber Raman oscillator of claim 4 wherein the temporal delay means comprises a translatable prism for adjusting the oscillator path length so that pulses from the pumping source arrive synchronously in the optical fiber with pulses travelling in the oscillator.

6. The fiber Raman oscillator of claim 4 wherein the polarization reconstruction means comprise a plurality of waveplates adjusted to reset the polarization of each pulse on each pass through the oscillator.

7. The fiber Raman oscillator of claim 1 wherein the dispersion compensating delay means is a pair of adjustably spaced gratings.

8. The fiber Raman oscillator of claim 1 wherein the pumping source is a modelocked YAG or modelocked dye laser.

9. The fiber Raman oscillator of claim 8 wherein the pumping source is a CW modelocked Nd:YAG laser operating at about 1064 nm.

10. The fiber Raman oscillator of claim 9 wherein the puming source produces pulses of about 80 ps pulse width at a pulse rate of 1 MHz to 100 MHz.

11. The fiber Raman oscillator of claim 1 wherein the optical fiber is about 80 m to 130 m in length.

12. The fiber Raman oscillator of claim 1 wherein the input means comprise a dichroic mirror and the output means comprise a partially reflecting and partially transmitting mirror.

13. A method of producing short pulses down to subpicosecond pulse widths at any color in a fiber Raman oscillator, comprising:
    synchronously pumping the fiber Raman oscillator;
    producing a compensating dispersive delay in the oscillator to compensate for pulsebroadening in the fiber.

14. The method of claim 13 further comprising tuning the oscillator to limit the bandwidth to produce high quality pulses of the desired pulsewidth.

15. The method of claim 14 comprising passing through a pair of spaced parallel gratings.

16. The method of claim 13 wherein the step of producing a compensating dispersive delay is performed by passing through a dispersive delay line.

17. An integrated fiber Raman oscillator for producing short pulsewidths at any color, comprising:
    an optical fiber;
    an optical fiber coupler having first and second inputs and first and second outputs, the optical fiber being connected between the first output and the second input to form a loop, the coupler providing strong coupling of Raman pulses between the second input and first output to form a continuous loop;
    a synchronous pumping source for inputing pumping pulses through the first input into the optical fiber.

18. The integrated fiber Raman oscillator of claim 17 wherein the coupler provides a compensating dispersive delay to compensate for pulsebroadening in the fiber.

19. The integrated fiber Raman oscillator of claim 18 wherein the fiber comprises a double core fiber which limits the bandwidth of the oscillator to produce pulses of the desired pulse width.

* * * * *